United States Patent
Charge et al.

(10) Patent No.: US 12,392,185 B2
(45) Date of Patent: *Aug. 19, 2025

(54) GLAZED DEVICE FOR A VEHICLE DOOR, COMPRISING A FLUSH-FITTED MOVABLE PANEL, AND CORRESPONDING DOOR

(71) Applicant: ADVANCED COMFORT SYSTEMS FRANCE SAS—ACS FRANCE, Bressuire (FR)

(72) Inventors: Philippe Charge, Bressuire (FR); Mickaël Desbois, Haute Goulaine (FR); Cédric Seynat, Bressuire (FR)

(73) Assignee: ADVANCED COMFORT SYSTEMS FRANCE SAS—ACS FRANCE, Bressuire (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/706,747

(22) PCT Filed: Nov. 2, 2021

(86) PCT No.: PCT/EP2021/080385
§ 371 (c)(1),
(2) Date: May 2, 2024

(87) PCT Pub. No.: WO2023/078533
PCT Pub. Date: May 11, 2023

(65) Prior Publication Data
US 2025/0116144 A1    Apr. 10, 2025

(51) Int. Cl.
*E05D 15/16*    (2006.01)
*B60J 1/17*    (2006.01)

(52) U.S. Cl.
CPC .............. *E05D 15/165* (2013.01); *B60J 1/17* (2013.01); *E05Y 2201/224* (2013.01); *E05Y 2900/55* (2013.01)

(58) Field of Classification Search
CPC ......... B60J 10/76; B60J 10/34; E05D 15/165; E05Y 2600/526; E05Y 2900/55
(Continued)

(56) References Cited

U.S. PATENT DOCUMENTS 3,441,309 A * 4/1969 Halstead ................. B60R 21/12
49/379
4,015,875 A * 4/1977 Setina ..................... B60R 21/12
49/379
(Continued)

FOREIGN PATENT DOCUMENTS

EP    778168 A1    6/1997
EP    857844 A1    8/1998
(Continued)

*Primary Examiner* — Michael McCullough
(74) *Attorney, Agent, or Firm* — S.J. Intellectual Property LTD.

(57) ABSTRACT

A glazed device for a vehicle door including a mobile panel configured to be movable relative to a fixed panel and a frame for guiding the mobile panel within the door. The device comprises at least one guide rail secured to the fixed panel and configured to receive the mobile panel in sliding engagement. A rail mount is fixed to the inner side of the fixed panel and extends substantially parallel to the guide rail. The rail mount includes a mounting interface for coupling the guide rail to the fixed panel. The configuration simplifies assembly, improves structural integration, and facilitates secure retention of the mobile panel during operation. The invention also relates to a vehicle door incorporating the glazed device.

12 Claims, 10 Drawing Sheets

(58) Field of Classification Search
USPC .......................................... 49/360, 413, 349
See application file for complete search history.

(56) References Cited

U.S. PATENT DOCUMENTS

| | | | | |
|---|---|---|---|---|
| 4,671,013 | A * | 6/1987 | Friese | B60J 1/1861 49/352 |
| 6,125,585 | A * | 10/2000 | Koneval | E05F 15/643 49/352 |
| 6,125,587 | A * | 10/2000 | Woods | B60J 1/1861 49/404 |
| 6,223,470 | B1 * | 5/2001 | Millard | B60J 5/107 49/374 |
| 6,422,638 | B1 * | 7/2002 | Carnaghi | B60J 1/1861 49/374 |
| 6,547,298 | B2 * | 4/2003 | Sotiroff | B60J 7/04 410/129 |
| 6,691,464 | B2 * | 2/2004 | Nestell | B60J 1/1861 49/374 |
| 8,246,101 | B2 * | 8/2012 | Cicala | B60J 1/1861 296/146.16 |
| 9,211,780 | B2 * | 12/2015 | Lahnala | B60J 10/70 |
| 9,463,684 | B2 * | 10/2016 | Lahnala | B60J 1/16 |
| 10,167,664 | B2 * | 1/2019 | Pretzer | E06B 3/4407 |
| 10,562,385 | B2 * | 2/2020 | Krause | B60J 10/79 |
| D948,402 | S * | 4/2022 | Bayatyan | D12/195 |
| 11,299,019 | B2 * | 4/2022 | Veille | B60J 1/17 |
| 2003/0182865 | A1 * | 10/2003 | Nestell | B60J 1/1861 49/374 |
| 2003/0213179 | A1 * | 11/2003 | Galer | B60J 1/1861 49/413 |
| 2005/0184557 | A1 * | 8/2005 | Suzuki | B60J 1/1861 296/146.16 |
| 2008/0216410 | A1 | 9/2008 | Lahnala | |
| 2009/0241426 | A1 * | 10/2009 | Seiple | B60J 1/1861 49/374 |
| 2018/0170154 | A1 * | 6/2018 | Charge | B60J 1/17 |
| 2024/0424878 | A1 * | 12/2024 | Charge | B60J 10/76 |

FOREIGN PATENT DOCUMENTS

| | | |
|---|---|---|
| EP | 1612072 B1 | 1/2006 |
| EP | 1422091 B1 | 5/2006 |
| EP | 3647093 B1 | 4/2022 |
| FR | 1263183 A | 6/1961 |
| WO | 2007071629 A1 | 6/2007 |

* cited by examiner

SECTION B-B

GLAZED DEVICE FOR A VEHICLE DOOR, COMPRISING A FLUSH-FITTED MOVABLE PANEL, AND CORRESPONDING DOOR

1. FIELD OF THE INVENTION

The field of the invention is that of motor vehicles.

More precisely, the invention relates to the equipment of openings arranged in vehicles, and particularly vehicle doors.

In particular, the invention relates to vehicle doors equipped with at least one substantially vertically mobile glazed panel, particularly for changing from a closed position to an open position wherein it fully or partially penetrates into a lower bodywork inner panel (the mobile panel, of course, being able to generally take a plurality of intermediate positions).

Such a vehicle door may particularly be a side door, but the invention can also apply, for example, to the swing and/or sliding doors of a vehicle, including the rear doors, the tailgates, etc., or even a fixed part of the bodywork of a vehicle.

2. PRIOR ART

Examples of such devices are particularly described in the patent documents EP1422091, EP1612072 or EP3647093.

According to this approach, a frame is provided, on the side oriented towards the inside of the vehicle, supporting one or more (conventionally two) rails, cooperating with pads integral with the mobile glazed panel, and fixed on the face thereof oriented towards the inside of the vehicle. The frame may, where applicable, be truncated and be limited to struts supporting the rails.

This technique is interesting, because it makes it possible to create original designs, due to the elimination of the conventional door frame, while keeping effective guiding and holding of the mobile panel.

Devices comprising a glazed fixed part are also known, wherein an opening is arranged, which may be uncovered or covered by a mobile panel guided along rails mounted on the face of the glazed fixed part oriented towards the inside of the vehicle. The applicant has filed many patents on this approach, of which the general principle of this technique is particularly described in the patent documents EP778168 and EP857844. In this case, the mobile panel is generally mobile along a horizontal axis and with a complex movement, known as swinging.

It would be interesting, in certain situations, to combine the two approaches, namely the presence of a glazed fixed part and of a vertically mobile panel to retract at least partly in an inner door shell, and covering an opening of which three sides, two side edges and an upper edge, are defined in the fixed part. However, this combination is neither easy nor direct. Placing an opening on the lower edge of the fixed glazed panel requires a specific approach for holding and moving the mobile panel. It is essential to maximise the clear opening, and therefore reduce where possible the size of the attachment parts on the fixed part (rails, frame, etc.), while effectively, reliably and durably ensuring the guiding of the mobile panel, the sealing (including in the presence of a high-pressure jet), and the safety, etc.

Another important aspect is the ease of assembly and mounting of the device, and particularly of the mobile panel, when the fixed part is secured to the inner door shell, regardless of during the first installation or for a maintenance operation.

3. OBJECTS OF THE INVENTION

In particular, the object of the invention is to mitigate these drawbacks of the prior art.

More precisely, the object of the invention, in at least one embodiment, is to provide a glazed device for producing a vehicle door, which is easy to implement and to assemble, for example on an assembly line.

Another object of the invention, according to at least one embodiment, is to provide such a glazed device, which can be easily held during its mounting or when replacing the mobile panel, for example following an accident.

4. DISCLOSURE OF THE INVENTION

These objects, as well as others that will become apparent hereinafter are achieved by means of a glazed device intended to be mounted on an inner door shell to form a vehicle door or on a bodywork element, comprising a glazed fixed part and a mobile glazed panel that can slide relative to said fixed part along a substantially vertical axis, and can selectively at least partially cover or uncover an opening in said fixed part, said mobile panel being guided along rails supported by said fixed part.

According to the invention, said mobile panel supports an overmoulding, which is obtained by encapsulation, covers the rim of said mobile panel and extends over at least one edge of the surface of said mobile panel oriented towards the inside of said vehicle, and of which a lower portion extends on the lower edge of said mobile panel and has at least one stop capable of cooperating with a frame, a central crosspiece and/or an attachment part on a guide rail supported by said fixed part, said stops ensuring that the movement of said mobile panel is limited relative to said fixed part in two directions substantially perpendicular to said substantially vertical axis, at least while said mobile panel is mounted on said fixed part.

Indeed, the flexibility of the guide should be taken into account, particularly before securing the mobile panel to the window lifting means, generally fixing to the lower part of this mobile panel, the latter supporting guide pads in the upper part. Therefore, the mobile panel may move along X (according to the length of the vehicle) and/or along Y (according to the width of the vehicle). In order to control this, according to the invention, one or two stops are formed directly in the overmoulding, also called encapsulation hereinafter, so as to provide easy and effective means for guiding and/or holding the mobile panel for its mounting, and where applicable for a maintenance operation.

According to one embodiment, said encapsulation comprises two stops, which extend close to said rails and/or said frame.

In particular, said stops can cooperate with a recess formed in said frame, said crosspiece and/or said attachment part on a guide rail.

This approach is easy to implement and effective.

According to a particular aspect, said lower portion of the encapsulation may further comprise an element for connecting with a window lifting mechanism.

Securing to the window lifter is thus facilitated, and does not require particular attachment parts.

In particular, said connecting element may have at least one hole for securing it with said window lifting mechanism. This hole advantageously has a flexible adjustment part.

According to another particular aspect, said lower portion of said encapsulation may extend by two side portions each supporting a pad capable of sliding in one of said rails, or a pad support receiving said pad.

Once again, this makes it possible to simplify the manufacturing and mounting of the device, the encapsulation being performed in a single operation and ensuring a plurality of distinct functions.

According to a particular embodiment, these pads have a substantially C-shaped section, a first end of said pad being engaged in said side portion of said encapsulation and a second end of said pad, supporting a guide element in said rail, which extends substantially above said first end.

This C-shaped section makes it possible to reduce the overall size of the pad.

According to another particular embodiment, these pads have a substantially S-shaped section, a first end of said pad being engaged in said side portion of said encapsulation and a second end of said pad, supporting a guide element in said rail, which extends beyond the edge of said fixed panel and above the corresponding edge of the fixed part.

This approach, combined with a suitable rail, also makes it possible to have a reduced size, and therefore an optimised clear opening.

According to another particular aspect, said encapsulation has, sectionally, on at least one or its edges, an extension which extends towards the outside of said mobile panel and towards the inside of the vehicle.

This makes it possible, where applicable by combining with other elements such as a seal, to optimise the management of the sealing and the discharging of the water.

According to another particular aspect, said encapsulation has an upper portion, connecting said side portions, so as to extend around the entire periphery of said mobile panel.

The various particular aspects described above may of course be combined, in whole or in part, to optimise the use of the encapsulation.

The invention also relates to a motor vehicle comprising at least one glazed device as described above.

In particular, in such a vehicle, said covering device may be mounted in the upper part of a door of said vehicle, said mobile panel moving at least partially in a lower part of said door.

5. LIST OF FIGURES

The invention, as well as the various advantages thereof, will be understood more easily thanks to the following description, given purely by way of illustrative and non-limiting example with reference to the appended drawings, wherein.

6. DETAILED DESCRIPTION OF AN EMBODIMENT OF THE INVENTION 6.1 General Structure The invention therefore relates to a novel technique for manufacturing and/or maintaining a glazed device of a door (side door, rear door, tailgate, cabin door, etc.), or even a fixed part of the motor vehicle bodywork. The glazing, or mobile panel, is aligned and flush-fitted with at least one edge of the bodywork, that is to say that no frame or frame element protrudes outside of the vehicle, relative to the plane of this glazed part, and is guided so as to penetrate into the inner door shell (or an equivalent bodywork element), in a vertical direction.

Figure 1:
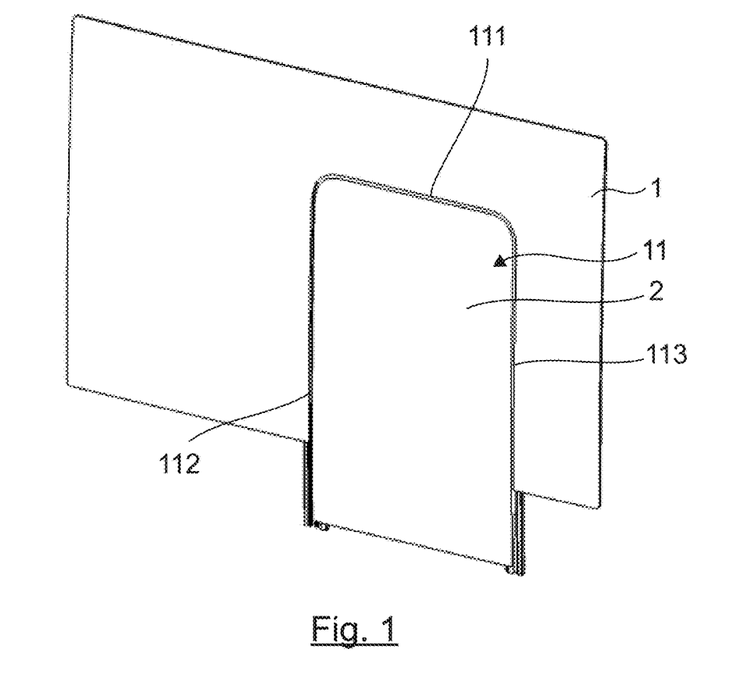
FIG. 1 and FIG. 2 are schematic sectional views of one embodiment of a glazed device of a vehicle door according to the invention, respectively seen from the side oriented towards the outside and the inside of the vehicle.
Figure 2:
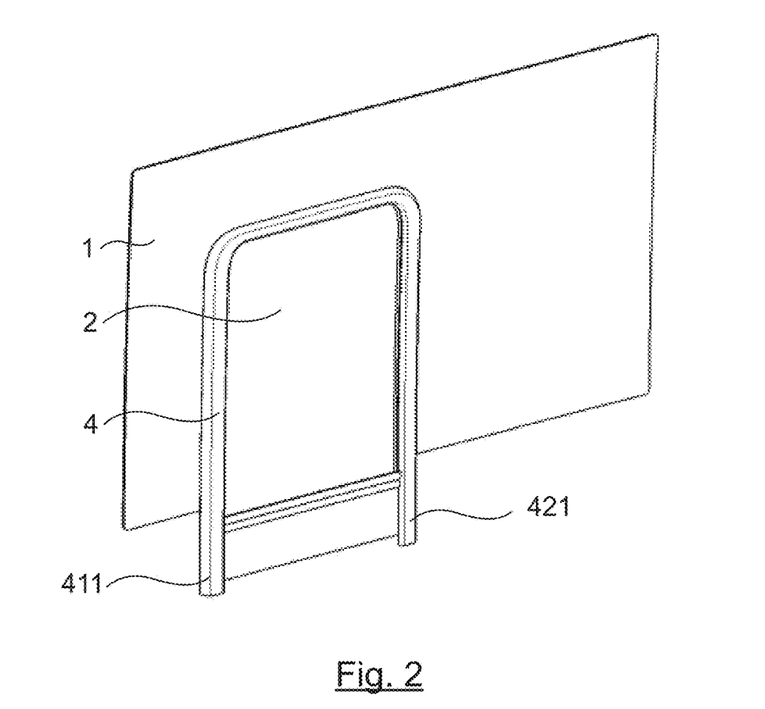

FIGS. 1 and 2 schematically illustrate such a device, seen from the side corresponding to the outside, respectively to the inside, of the vehicle. This device is intended to be secured, via the fixed part, to an inner door shell or to the bodywork of the vehicle, not shown, which extends below the device.

Figure 3:
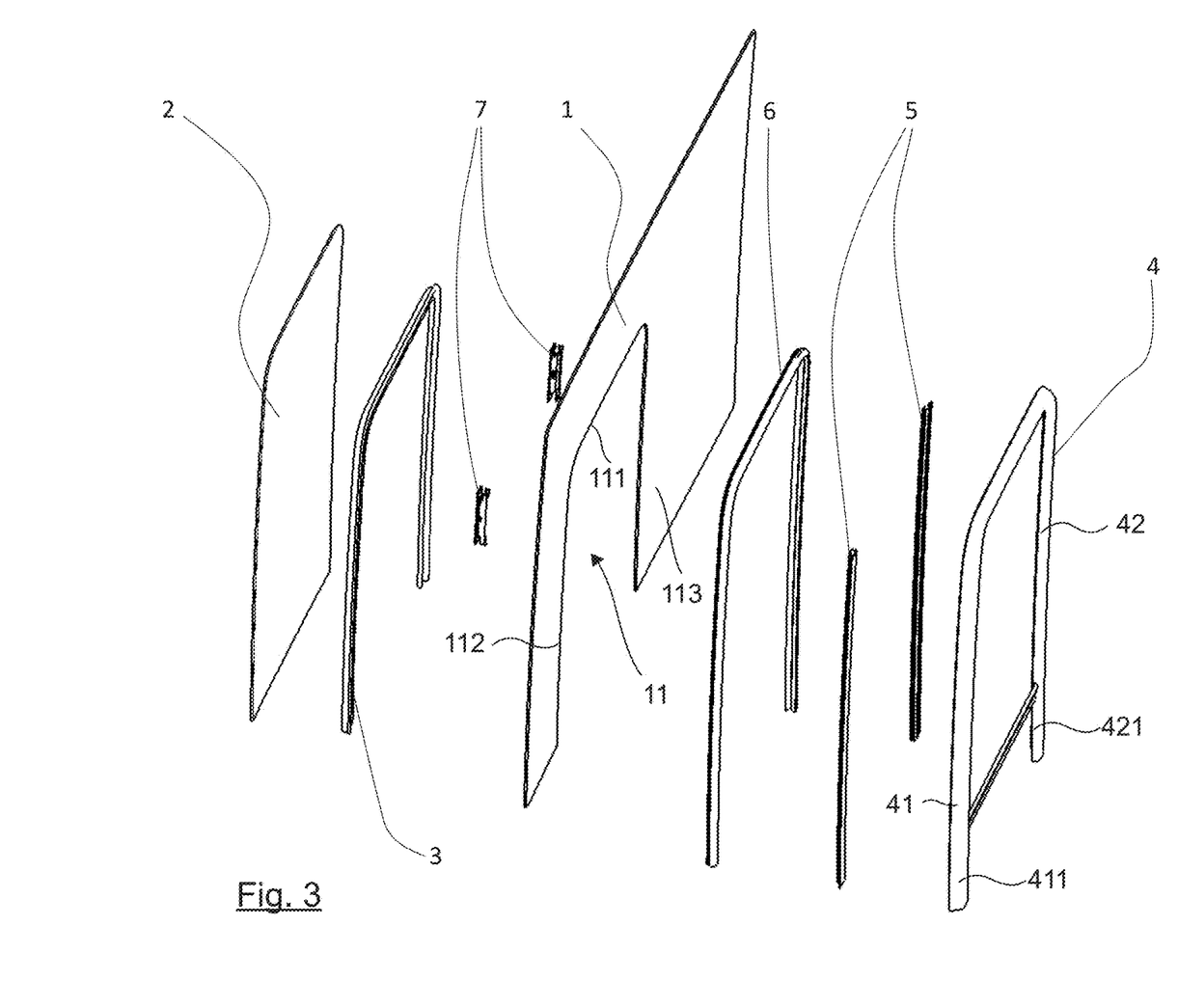
FIG. 3 is an exploded view of the main elements forming the device of FIGS. 1 and 2.

The main constituent elements of the device appear in the exploded view of FIG. 3. The device thus comprises a fixed part 1, which may particularly be a glazing in one piece of which the outer edges correspond to the edges of the upper part of the door. An opening 11 is cut in this fixed part, defined by an upper edge 111 and two vertical side edges 112 and 113 of the fixed part. The lower part of the opening is not delimited in the fixed part but formed in its lower edge, to make it possible to move the mobile panel 2.

This mobile panel 2, which may also be glazed, is therefore designed and sized to fit into the opening 11, in a closed position, and to shift downwards, typically inside the inner door shell, in an open position. This movement may for example be ensured by an electric motor and a suitable transmission (not shown) connecting the bottom part of the mobile panel 2 to the motor.

The mobile panel 2 receives an encapsulation 3, which extends on one or more edges of the mobile panel, as illustrated hereinafter according to various embodiments.

Figure 5:
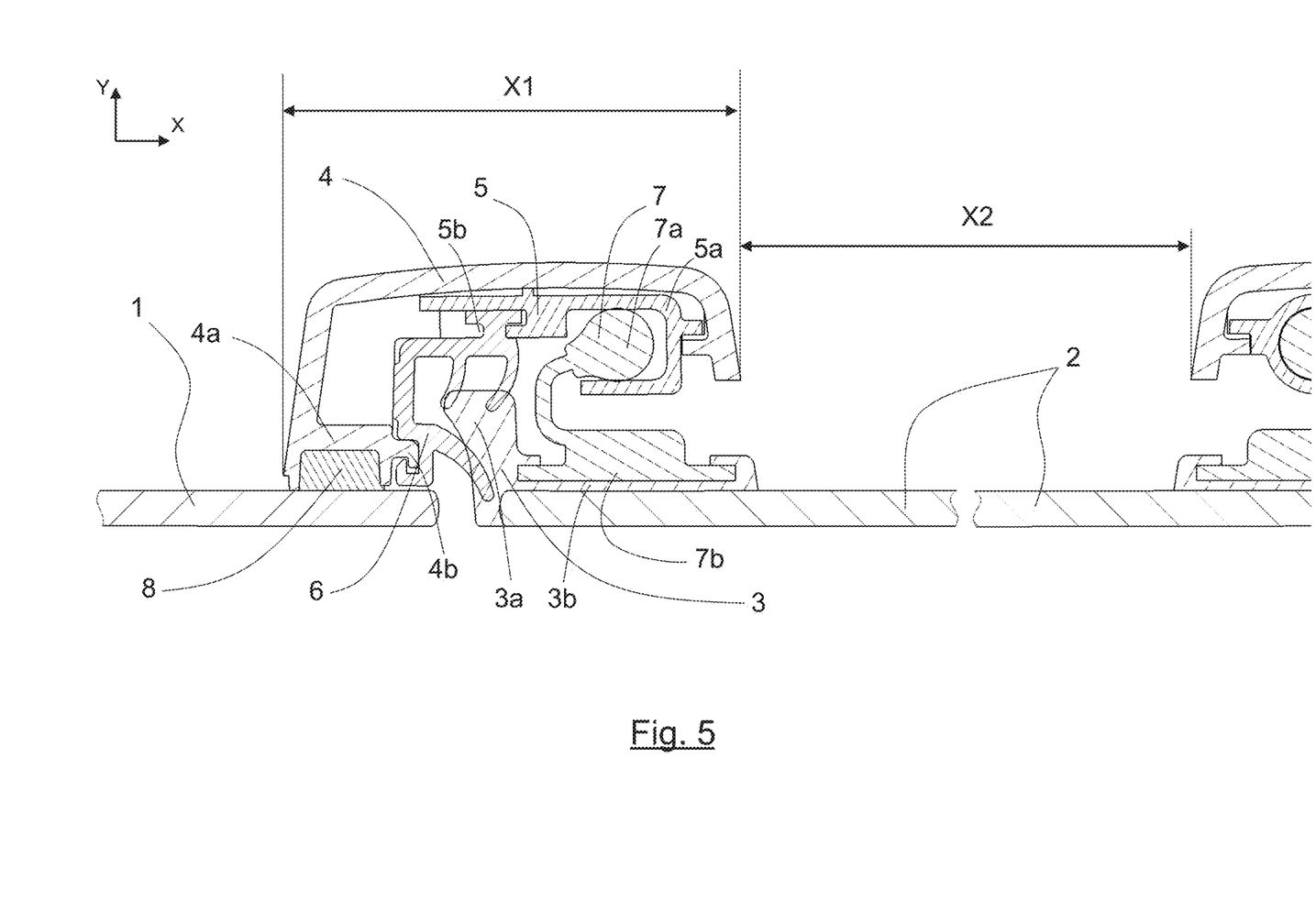
FIG. 5 is a section of the frame and of the rail of the device of FIG. 4, according to a first embodiment.
Figure 8:
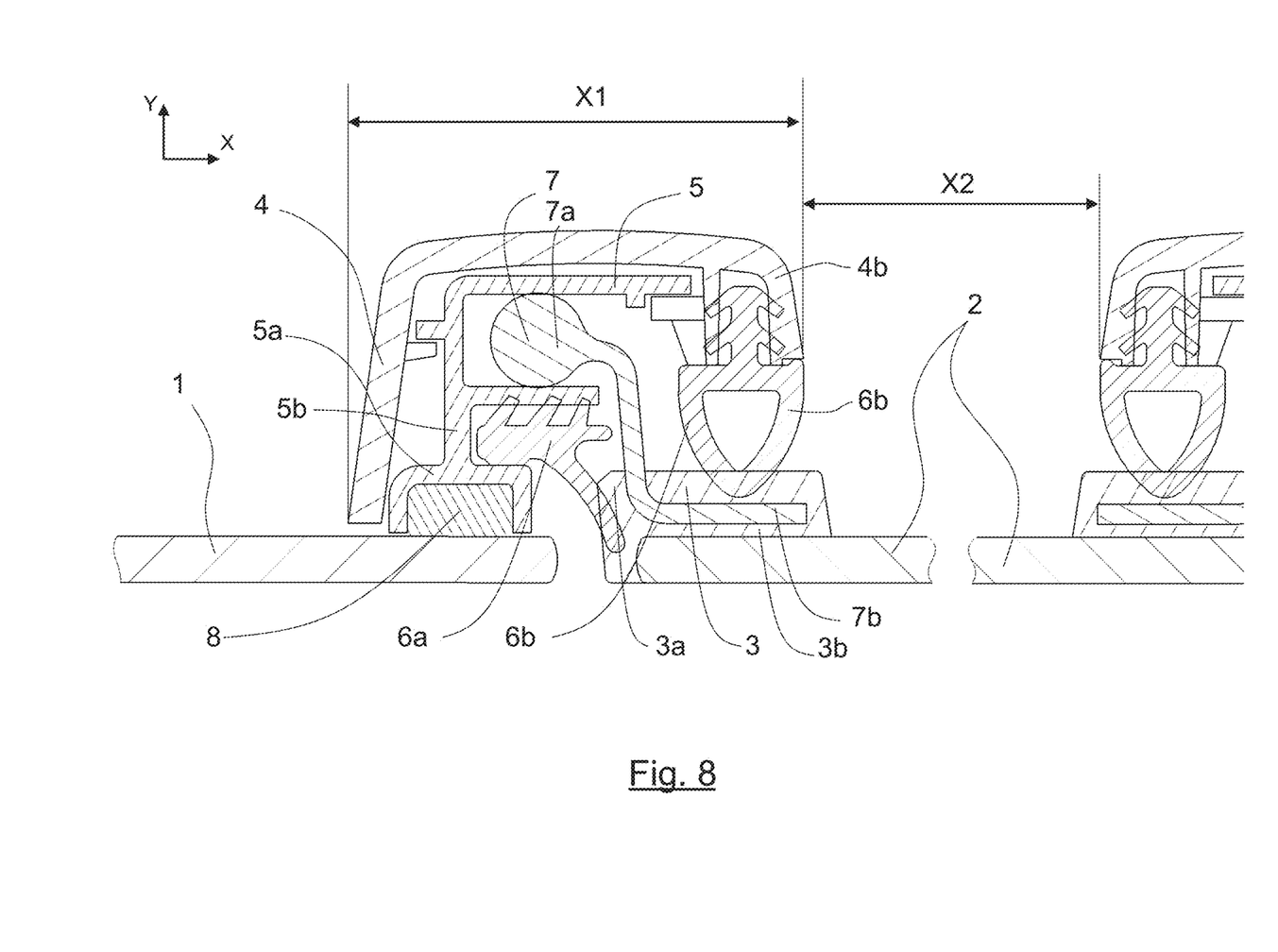
FIG. 8 is a section of the frame and of the rail of the device of FIG. 4, according to a second embodiment.

This encapsulation 3 may particularly extend over the rim of the mobile panel and around the periphery thereof, over the face oriented towards the inside of the vehicle, over a few millimetres or centimetres, as illustrated in FIGS. 5 and 8, commented on hereinafter.

The fixed part 1 supports a frame 4, on its face oriented towards the inside of the vehicle, at least along the upper edge 111 and vertical side edges 112 and 113. The side portions 41, 42 of the frame support and/or are supported by rails 5, making it possible to hold and guide the mobile panel 2. As shown particularly in FIG. 2, the frame and/or the rails extend below the fixed part 1 (parts 411 and 421).

A seal 6 is mounted in the frame 4, along its side and upper portions.

The mobile panel 2 is equipped with guide pads 7, capable of cooperating with the rails 5. They may particularly be secured directly to the encapsulation, or via an intermediate support.

The frame and the rails are secured to the fixed part by a main bead of glue, referenced 8 in FIGS. 5 and 8.

6.3 Mounting the Rail and Frame—First Approach

Figure 4:
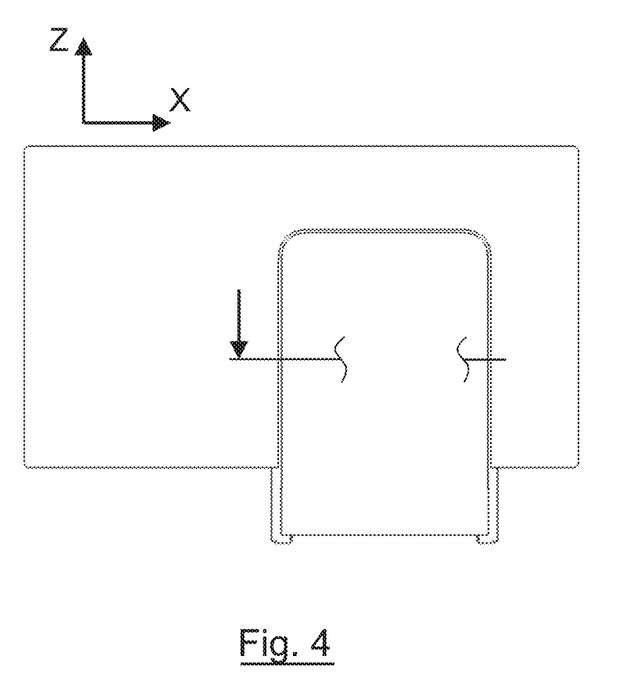
FIG. 4 is a schematic view of the device of FIGS. 1 and 2, showing the location of the section of FIG. 5.

FIG. 4 is a simplified view of the device, specifying the location of the section of FIG. 5. FIG. 5 shows a first example of design of the frame, of the rails and of the pads.

According to this approach, the frame 4 is glued to the fixed part 1, via a bead of glue 8 that fits in the recess 4a provided for this purpose. The frame 4 supports a guide rail 5, of which a guide portion 5a is capable of cooperating with an essentially spherical portion 7a of the pad 7.

The seal 6, which has three lips is secured on the one hand to the frame 4, via the attachment portion 4b, and on the other hand to the rail 5, via the attachment portion 5b.

The mobile panel 2 supports an encapsulation 3, of which a portion 3a extends towards the inside of the vehicle by moving away from the mobile panel, and forms a side surface and an upper surface cooperating with the lips of the seal. This portion 3a also covers the rim of the mobile panel.

A portion 3b extends around the periphery of the mobile panel 5, on its face oriented towards the inside of the vehicle, and receives an end 7b of the pad 7, so as to hold it.

In this embodiment, the pad has a generally C-shaped section. In a way it is folded back on itself, the two ends 7a and 7b being substantially superimposed, one on top of the other (according to an axis perpendicular to the plane defined by the mobile panel). This makes it possible to reduce the width X1 of the frame and therefore to benefit from a significant clear opening (X2).

Figure 6:
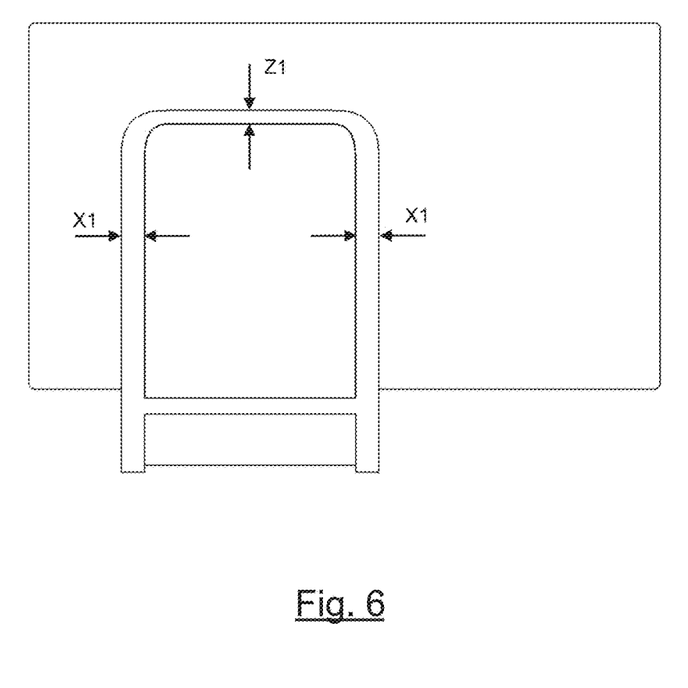
FIG. 6 is a simplified view of the device of FIGS. 1 and 2, seen from the inside, showing the location of the section of FIG. 7.

With the same objective in mind, and as illustrated by FIG. 6, it is possible that the frame is narrower (Z1) in the upper part, which does not contain a rail. According to the section of FIG. 7, it is thus noted that the width of the encapsulation 3 is reduced, as is that of the frame 4, which holds the seal 6 by its two sides.

Figure 7:
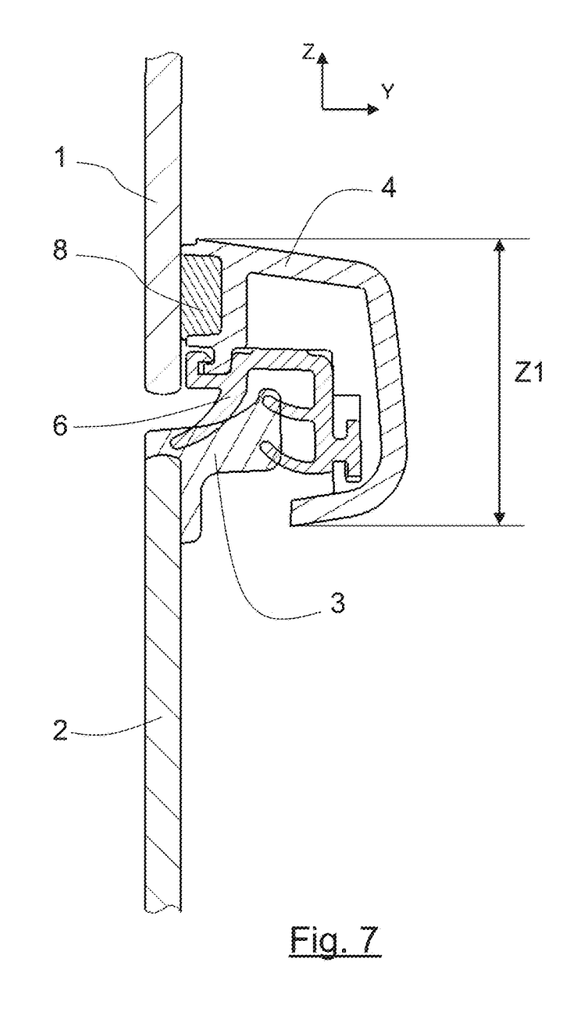
FIG. 7 is a section of the upper part of the frame of the device of FIG. 6, according to a first embodiment.

According to this embodiment, the frame is glued to the fixed part around its entire periphery.

6.4 Mounting the Rail and Frame—Second Approach

However, it is desirable to also reduce the width of the frame. The approach illustrated by FIG. 8 (section in the location defined in FIG. 4) makes it possible to achieve this objective.

The mobile panel 2 supports an encapsulation 3, of which a portion 3a extends towards the fixed part by moving away from the mobile panel, and forms a side surface cooperating with a lip of a first seal 6a. This portion 3a also covers the rim of the mobile panel.

A portion 3b of the encapsulation extends around the periphery of the mobile panel 5, on its face oriented towards the inside of the vehicle, and receives an end 7b of the pad 7, so as to hold it.

In this implementation, the pad has a generally S-shaped section, the guide end 7a, essentially cylindrical, being shifted beyond the mobile panel 2, at least partly above the fixed part 1. Other sections are however possible in this embodiment, including the C-shaped section.

According to this second approach, the rail 5 is glued, via its part 5a forming a recess for receiving the bead of glue 8, at the fixed part. This rail 5 supports the frame 4, for example by interlocking, for the side portions of the frame. It also supports the seal 6a, via a recess 5b. This makes it possible to effectively reduce the overall width of the frame, and therefore optimise the clear opening.

The end 4b of the frame oriented towards the opening supports a second seal 6b, coming into contact with the upper part of the encapsulation 3.

Figure 9:
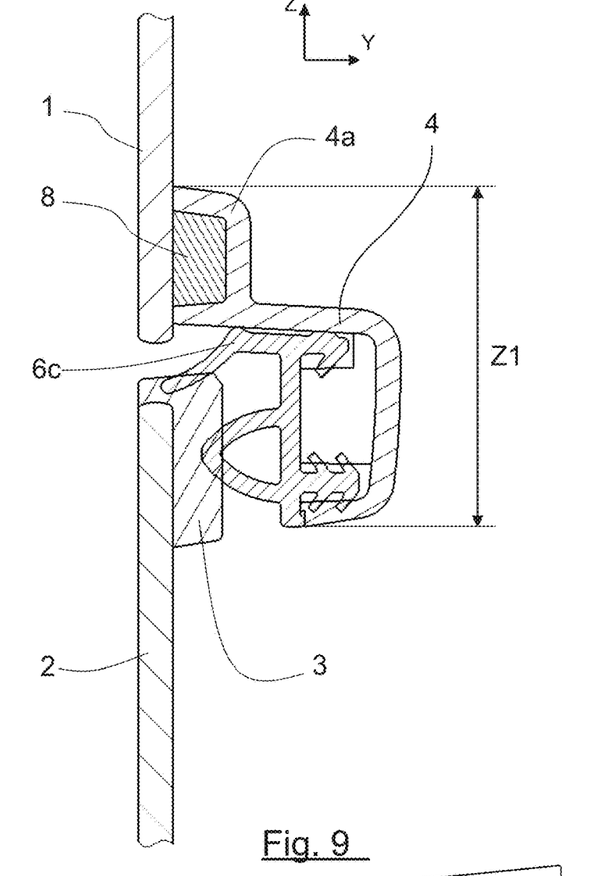
FIG. 9 is a section of the upper part of the frame of the device of FIG. 6, according to a second embodiment.

FIG. 9 illustrates the section of the upper portion of the frame, according to this second embodiment. Due to the fact that of course there is no rail on this upper portion, the frame 4 is glued directly to the fixed part 1, via the bead of glue 8 placed in the recess 4a. Only one seal 6c, of section substantially different to that of the seal 6b, is supported by the frame.

Thus, on the side parts, the rails 5 are glued to the fixed part, whereas the frame 4 is glued to the fixed part in its upper part, by the same bead of glue 8, circulating in the recesses 5a, 4b respectively.

6.5 Blocking the Bottom Part of the Mobile Panel

Figure 10:
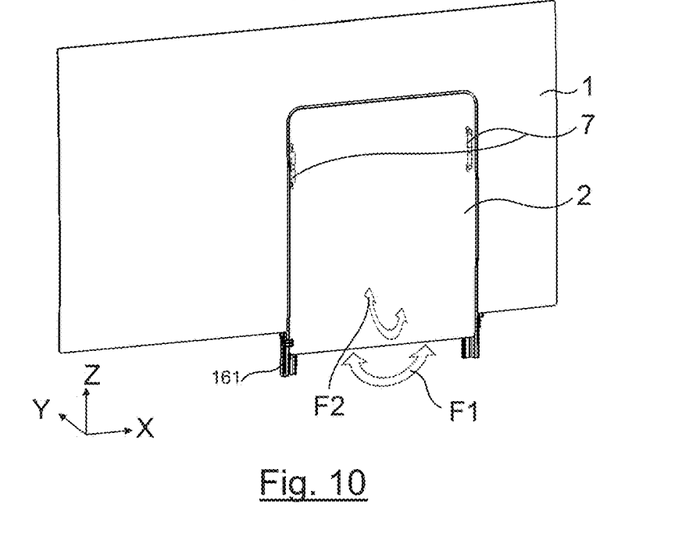
FIG. 10 is another view of the device of FIGS. 1 and 2, illustrating the possible unintentional movements of the mobile panel, particularly during its mounting.

As the mobile panel 2 is guided by two pads 7 that are located on its top part, its bottom part may be subjected, as illustrated in FIG. 10, to unintentional movements along the X (arrow F1) and Y (arrow F2) axes, due to the flexibility of the guiding, in particular during the mounting, before attaching the window lifting mechanism.

In order to prevent, or at least reduce, these unintentional movements along X and along Y, one or two stops may be provided.

As illustrated in FIGS. 11 to 14, the encapsulation of the mobile panel 3 directly integrates one or two stops 35, 36, cooperating with the rails and/or the frame.

Figure 11:
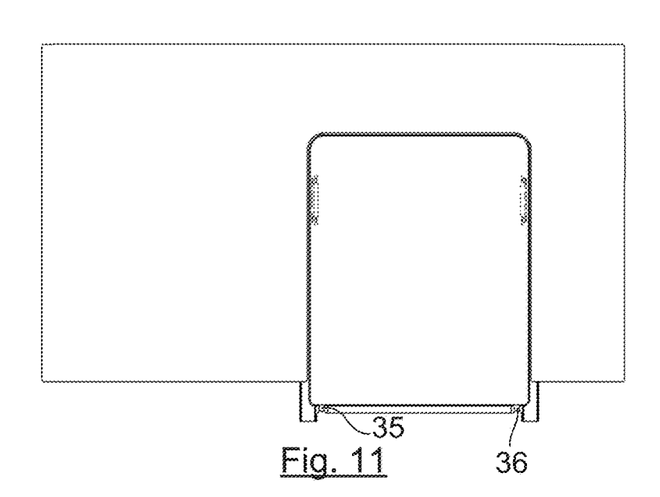
FIG. 11 is another view of the device of FIG. 10, showing the location of the stops according to the invention.
Figure 12:
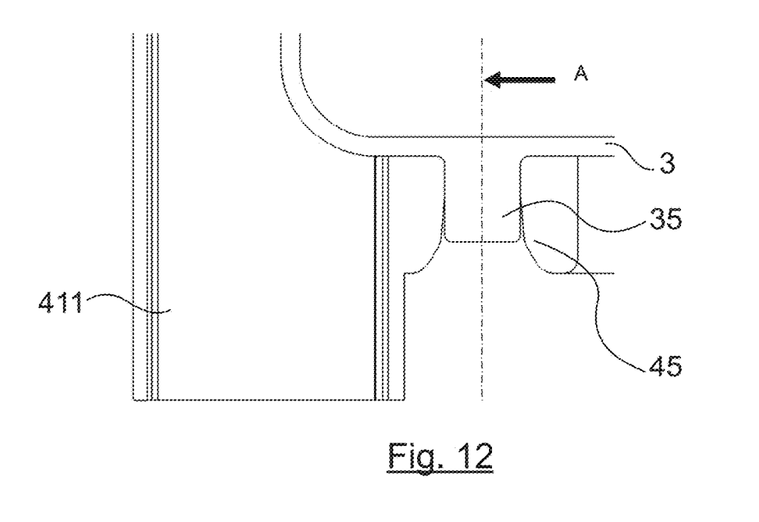
FIG. 12 is an enlarged view of one of the stops of the device of FIG. 11, showing the axis A of the section of FIG. 13.

FIG. 11 shows a general view of the device, of which the part supporting the stop 35 is enlarged in FIG. 12. The encapsulation 3 of the mobile panel has a stop 35, cooperating with an additional element 45 integral with the fixed part, and particularly with the lower portion 411 of the frame, with a central crosspiece connecting the two side parts of the frame or of an attachment part on the rail or on the frame.

Figure 13:
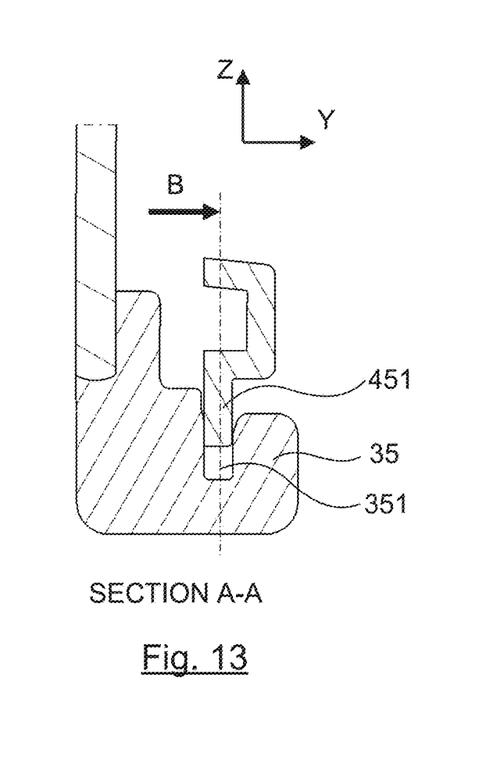
FIG. 13 illustrates the section along the axis A of FIG. 12.

As can be seen in the section A-A of FIG. 13, the blocking of the fixed panel along the Y axis is ensured by the groove 351 formed in the stop 35, cooperating with a portion 451 of the fixed part, penetrating into the groove.

Figure 14:
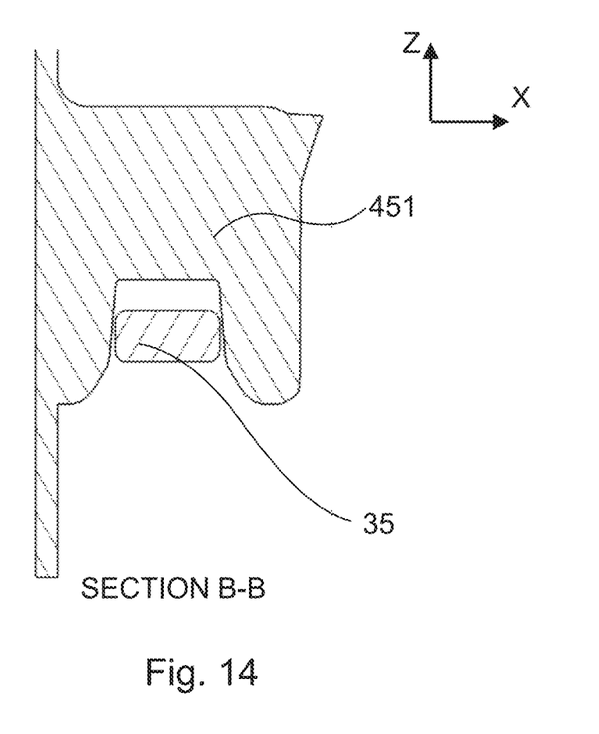
FIG. 14 illustrates the section along the axis B of FIG. 13.

The blocking of the mobile panel along the X axis is illustrated by the section B-B of FIG. 14. The stop 351 formed in the encapsulation is held in the fixed part 451.

6.6 Connecting With the Window Lifter

Figure 15:
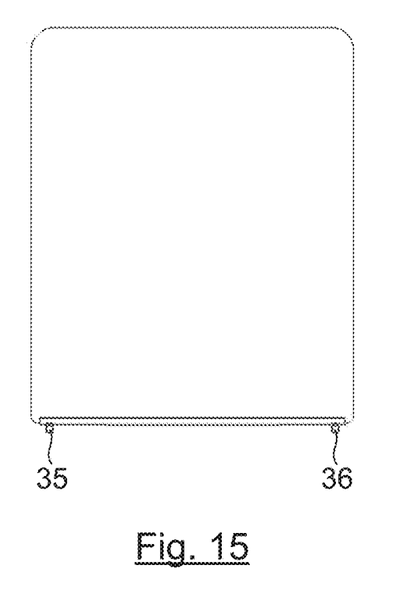
FIG. 15 illustrates the mobile panel of the device of FIG. 11.

FIG. 15 illustrates the mobile panel, with two stops 35, 36.

Figure 16:
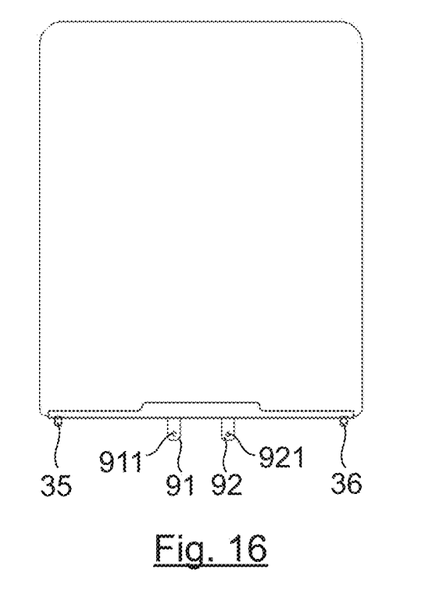
FIG. 16 shows an alternative embodiment of the mobile panel of FIG. 15, wherein the encapsulation comprises means for connecting with a window lifter.

As illustrated in FIG. 16, the encapsulation of the bottom part may further integrate means for connecting 91, 92 with a window lifter (not shown). Here, these connecting means comprise two projections, each having a hole 911, 921. Of course, it may also concern a single element, having two holes.

These holes 911, 921 enable securing, for example by screwing, to a window lifter. In order to counteract any mounting clearances, the holes may receive a flexible intermediate part.

6.7 Encapsulation of the Pads

Figure 17:
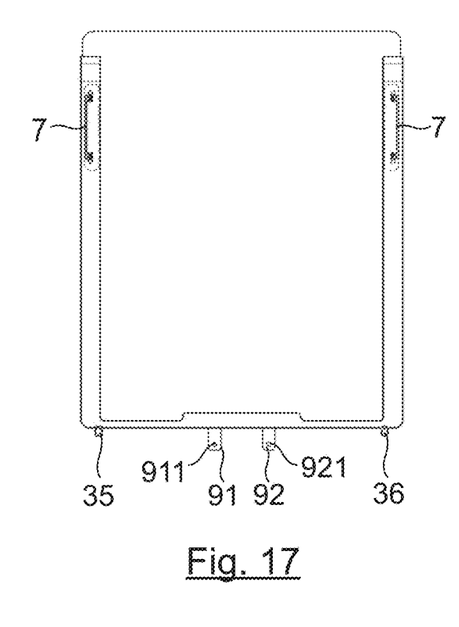
FIG. 17 shows an alternative embodiment of the mobile panel of FIG. 15, wherein the encapsulation comprises guide pads.

As illustrated in FIG. 17, the encapsulation may also extend on the side edges of the mobile panel. In such case, the encapsulation may support the pads 7 that slide in the rails 5, or pad supports, capable of receiving the pads themselves.

FIG. 8, already commented on, shows an example of section at a side edge of the device.

6.8 Encapsulation of the Entire Periphery of the Mobile Panel

Figure 18:
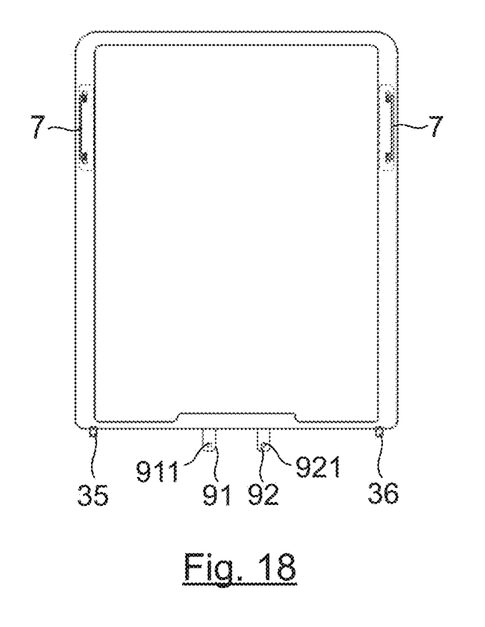
FIG. 18 shows an alternative embodiment of the mobile panel of FIG. 15, wherein the encapsulation comprises an upper portion.

In addition to the lower part and the side parts, the encapsulation may also extend along the upper part of the fixed panel, as illustrated in FIG. 18. In such case, the encapsulation may extend around the entire periphery of the mobile panel, where applicable by integrating all or part of the functions described above.

FIG. 9, already commented on, is an example of section of the device along this upper edge. The width of the encapsulation 3 can be reduced, relative to the side edges (FIG. 8) as is that of the frame 4, which holds the seal 6 by its two edges, which makes it possible to improve the clear opening.

What is claimed is:

1. Glazed device intended to be mounted on an inner door shell to form a vehicle door or on a bodywork element, comprising a glazed fixed part and a mobile glazed panel that can slide relative to the glazed fixed part along a substantially vertical axis, and can selectively at least partially cover or uncover an opening in the glazed fixed part, the mobile glazed panel being guided along rails supported by the glazed fixed part, wherein the mobile glazed panel supports an encapsulation, covering a rim of the mobile glazed panel and extends over at least one edge of a surface of the mobile glazed panel oriented towards a side corresponding to an inside of a vehicle, and of which a lower portion extends on a lower edge of the mobile glazed panel and has at least one stop capable of cooperating with at least one of a frame, a central crosspiece connecting the two side parts of a frame supported by the glazed fixed part or an attachment part on one of the rails supported by the glazed fixed part, the at least one stop ensuring that movement of the mobile glazed panel is limited relative to the fixed part in two directions substantially perpendicular to the substantially vertical axis, at least while said mobile panel is mounted on the glazed fixed part.

2. Glazed device according to claim 1, wherein the encapsulation comprises two stops, which extend close to the rails and/or the frame.

3. Glazed device according to claim 2, wherein the stops cooperate with a recess formed in the frame, said crosspiece or said attachment part on a guide rail.

4. Glazed device according to claim 1, wherein the lower portion of the encapsulation comprises an element for connecting with a window lifting mechanism.

5. Glazed device according to claim 4, wherein the connecting element has at least one hole for securing said connecting element with the window lifting mechanism, and supporting a flexible adjustment part.

6. Glazed device according to claim 1, wherein the lower portion of the encapsulation extends by two side portions each supporting a pad capable of sliding in one of the rails, or a pad support receiving a pad.

7. Glazed device according to claim 6, wherein the pads have a substantially C-shaped section, a first end of the pad being engaged in the side portion of the encapsulation and a second end of the pad, supporting a guide element in the rail, which extends substantially above the first end.

8. Glazed device according to claim 6, wherein the pads have a substantially S-shaped section, a first end of the pad being engaged in the side portion of the encapsulation and a second end of the pad, supporting a guide element in the rail, which extends beyond an edge of the mobile panel and above a corresponding edge of the glazed fixed part.

9. Glazed device according to claim 1, wherein the encapsulation has, sectionally, on at least one of its edges, an extension which extends towards the outside of the mobile glazed panel and towards the inside of the vehicle.

10. Glazed device according to claim 1, wherein the encapsulation has an upper portion, connecting the side portions, so as to extend around the entire periphery of the mobile glazed panel.

11. Motor vehicle comprising at least one glazed device mounted on an inner door shell to form a vehicle door or on a bodywork element of the motor vehicle, the at least one glazed device comprising a glazed fixed part and a mobile glazed panel that can slide relative to the glazed fixed part along a substantially vertical axis, and can selectively at least partially cover or uncover an opening in the glazed fixed part, the mobile glazed panel being guided along rails supported by the glazed fixed part, wherein the mobile glazed panel supports an encapsulation, covering a rim of the mobile glazed panel and extends over at least one edge of a surface of the mobile glazed panel oriented towards the inside of the vehicle, and of which a lower portion extends on a lower edge of the mobile glazed panel and has at least one stop capable of cooperating with at least one of a frame, a central crosspiece or an attachment part on one of the rails supported by the glazed fixed part, the at least one stop ensuring that movement of the mobile glazed panel is limited relative to the fixed part in two directions substantially perpendicular to the substantially vertical axis, at least while said mobile panel is mounted on the glazed fixed part.

12. Vehicle according to claim 11, characterised in that the covering device is mounted in an upper part of a door of the vehicle, the mobile panel moving at least partially in a lower part of the door.

* * * * *